(12) United States Patent
Zwemmer et al.

(10) Patent No.: US 9,812,255 B2
(45) Date of Patent: Nov. 7, 2017

(54) CONTACTLESS POWER AND DATA TRANSFER

(71) Applicant: STICHTING NATIONAAL LUCHT-EN RUIMTEVAART LABORATORIUM, Amsterdam (NL)

(72) Inventors: Robert Zwemmer, Uitgeest (NL); Pieter Rudolf Faasse, Amsterdam (NL); Steven Michiel Bardet, Amsterdam (NL)

(73) Assignee: STICHTING NATIONAAL LUCHT-EN RUIMTEVAART LABORATORIUM, Amsterdam (NL)

( * ) Notice: Subject to any disclaimer, the term of this patent is extended or adjusted under 35 U.S.C. 154(b) by 473 days.

(21) Appl. No.: 14/415,933

(22) PCT Filed: Jul. 16, 2013

(86) PCT No.: PCT/EP2013/065031
§ 371 (c)(1),
(2) Date: Jan. 20, 2015

(87) PCT Pub. No.: WO2014/012943
PCT Pub. Date: Jan. 23, 2014

(65) Prior Publication Data
US 2015/0228403 A1      Aug. 13, 2015

(30) Foreign Application Priority Data

Jul. 17, 2012   (EP) .................................... 12176697

(51) Int. Cl.
*H01F 38/14*   (2006.01)
*H01F 38/18*   (2006.01)
*H04B 5/00*    (2006.01)

(52) U.S. Cl.
CPC ............. *H01F 38/14* (2013.01); *H01F 38/18* (2013.01); *H04B 5/0037* (2013.01); *H01F 2038/143* (2013.01); *H01F 2038/146* (2013.01)

(58) Field of Classification Search
CPC .................................. H01F 38/14; H01F 38/18
(Continued)

(56) References Cited

U.S. PATENT DOCUMENTS 6,417,578 B1 *   7/2002   Chapman ................ F01D 15/10
                                                        290/43
7,197,113 B1 *   3/2007   Katcha ..................... A61B 6/032
                                                         378/101
(Continued)

FOREIGN PATENT DOCUMENTS

DE         296 07 713 U1     7/1996
DE    WO 2010105764 A1 *     9/2010  ............... H01F 3/00
(Continued)

OTHER PUBLICATIONS

Jul. 25, 2014 International Preliminary Report on Patentability issued in International Application No. PCT/EP2013/065031.
(Continued)

*Primary Examiner* — Rexford Barnie
*Assistant Examiner* — Joseph Inge
(74) *Attorney, Agent, or Firm* — Oliff PLC

(57) ABSTRACT

Assemblies and systems for contactless power and/or data transfer. The power transfer system includes at least a pair of opposing magnetic cores, each core having an L-shaped cross section. The data transfer system includes at least a pair of opposing stripline and/or microstrip conductors. Components for the power and/or data transfer system are preferably supported by a supporting surface in the rotor and/or stator. In some embodiments, the power and/or data transfer system is provided in a rotor flange and/or a stator flange for modularity.

12 Claims, 10 Drawing Sheets

(58) Field of Classification Search
USPC .......................................................... 307/104
See application file for complete search history.

(56) References Cited

U.S. PATENT DOCUMENTS

| | | | | |
|---|---|---|---|---|
| 7,717,619 B2* | 5/2010 | Katcha | ................... | G08C 17/04 |
| | | | | 378/15 |
| 2003/0179105 A1* | 9/2003 | Kazmierczak | ......... | G08C 17/04 |
| | | | | 340/870.31 |
| 2008/0296997 A1* | 12/2008 | Bando | .................. | H02K 21/029 |
| | | | | 310/261.1 |

FOREIGN PATENT DOCUMENTS

| | | |
|---|---|---|
| EP | 0 680 060 A1 | 11/1995 |
| EP | 0 926 690 A1 | 6/1999 |
| WO | 2009/033573 A1 | 3/2009 |
| WO | 2010/105764 A1 | 9/2010 |

OTHER PUBLICATIONS

Aug. 30, 2013 International Search Report issued in International Application No. PCT/EP2013/065031.

* cited by examiner

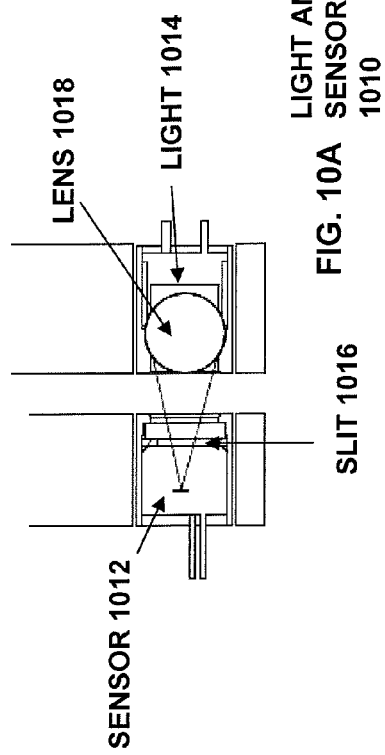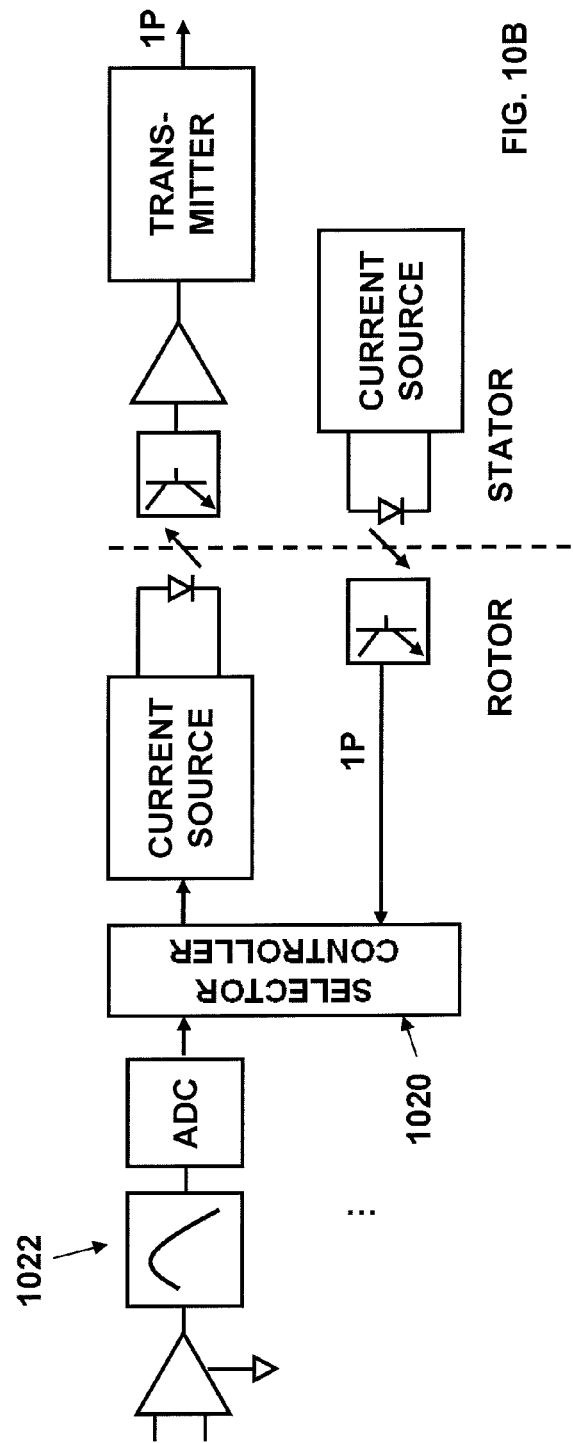

CONTACTLESS POWER AND DATA TRANSFER

FIELD OF THE INVENTION

The invention relates to contactless power and data transfer, and, in particular, though not exclusively, systems for contactless power and/or data transfer and to stator and rotor flange assemblies for use in such systems.

BACKGROUND OF THE INVENTION

Rotor-stator systems are used in many fields of technology and generally comprise a rotating part (a rotor) moving relative to a static part (a stator) about an axis of rotation. Rotor-stator systems play an important role in rotational systems including wind tunnel model propellers/rotors, computer tomography imaging systems, helicopter drive systems, etc.

The rotating rotor part often may comprise electronics, such as sensors, for measuring the conditions of the rotational system such as pressure sensors, strain gauge sensors, temperature sensors, and vibration sensors. A data acquisition system on the rotor may collect the sensory data and contactless send the data to processing electronics located at the stator side. Typically, a data acquisition system on a rotor part is powered using a rotating contactless power transformer wherein energy transfer from the static primary coil to the rotating secondary coil takes place through a process known as mutual induction.

In certain applications such as wind tunnel model propeller/rotor technology, very high rotational speeds up to 10,000 RPM or even higher may be reached so the electronics, including the data acquisition and power transfer parts, on the rotor are exposed to very high centrifugal forces, elevated temperatures and/or vibrational forces. Furthermore, especially in a wind tunnel model testing environment, an ever-increasingly number of sensors need to be installed on the rotor part so that the data acquisition system should be able to process data rates of more than 100 Mbits/second and to send these data real-time to the electronics at the stator side. The increasing amount of sensor electronics on the rotor further poses a serious problem in terms of space and installation time.

Systems for contactless power and data transmission in rotational systems are known. For example, U.S. Pat. No. 7,197,113 describes a contactless power transfer system for use in a CT scanner. Various transformer designs are proposed in order to provide power transfer in such system. Under high centrifugal acceleration however, the rotating coil structure may change shape, which may lead to unstable electrical characteristics, failures and breakage of the mechanically sensitive brittle magnetic cores in the transformer part. Similarly, U.S. Pat. No. 7,717,619 describes a data transmission system for a rotational system wherein pickup antennas or pads are cantilevered at a distance from a stripline and/or microstrip transmitter. Such design may be prone to failure as high mechanical forces push and stretch the rotating part of the system. Furthermore, a cantilevered antenna lacks proper shielding and thus is more susceptible to noise. These contactless data and power transmission systems are not designed to provide a system that is compact, protected from external influences and simple to install.

From the above, it follows that known contactless rotating data acquisition and power transfer systems are not suitable for very high rotational speed applications. These known systems are dedicated systems which do not suggest contactless data and energy transfer systems that can withstand high rotational forces, that are easily installed and replaced and that allow efficient integration of the sensors in a limited space. Accordingly, there is a need for improved contactless power and/or data transmission systems that at least alleviates some of these problems.

SUMMARY OF THE INVENTION

Hereinafter, embodiments of the invention aiming to alleviate the problem(s) described above will be described in further detail. It should be appreciated, however, that these embodiments may not be construed as limiting the scope of protection for the present invention. For instance, combinations of any of the embodiments and limitations are envisioned by the disclosure.

According to one embodiment, a contactless power and/or data transfer system comprises a stator flange and a rotor flange, wherein said stator flange and said rotor flange being configured to rotate relative to each other about an axis of rotation. Advantageously, a flange system allows for a more modular design such that the system may be fitted to various rotating systems.

Said stator flange comprises a stator ridge forming an annular support surface, said stator ridge comprising an surface having one or more electrical and/or magnetic stator elements mounted thereon. Said rotor flange comprises a rotor ridge forming an annular support surface, said rotor ridge comprising an inner surface having one or more electrical and/or magnetic rotor elements mounted thereon. Advantageously, the inner surface of the rotor ridge provides support to the rotor elements during rotation (as a supporting surface), especially during high speed rotation with relatively high centrifugal forces. In more general, the system is designed to operate at very high rotational speeds up to 10.000 rpm and to withstand centrifugal accelerations up to 5500 g. Said outer surface of said stator ridge is radially facing said inner surface of said rotor ridge (i.e., to form an air gap) such that such that contactless electromagnetic and/or magnetic coupling between said stator flange and said rotor flange is achieved. Advantageously, the stator ridge and the rotor ridge forms an enclosure for housing the electrical and/or magnetic rotor elements used for contactless electromagnetic and/or magnetic coupling.

According to one embodiment, a contactless power transfer system is provided. The system comprises at least a first magnetic core part having a first L-shaped radial cross section, said first magnetic core part affixed to the rotor flange such that during rotation, the first magnetic core part is pressed by centrifugal forces against a first supporting surface of the rotor flange. The system further comprises at least a second magnetic core part having a second L-shaped radial cross section, said second magnetic core part affixed to the stator flange. Said first and second magnetic core parts are positioned with each other such that the magnetic field lines of said first and second magnetic core parts form a closed loop.

Generally, the first magnetic core and/or the second magnetic core is made substantially of ferrite or any suitable material with high magnetic permeability. Note that due to the brittle nature of ferrite or other suitable materials, support is provided to the first magnetic core and/or the second magnetic core during rotation.

According to one embodiment, the first supporting surface may be disposed farther away from the axis of rotation than the first magnetic core part. The positioning of the supporting surface advantageously provides support to the first magnetic core part during rotation (as the centrifugal force pushes elements outward radially). Further, the first supporting surface may extend axially and faces towards the centre of rotation.

According to one embodiment, the first and second magnetic core parts are positioned to form two air gaps that separate the two magnetic cores axially and extend radially.

According to one embodiment, the magnetic field lines created by the first magnetic core and the second magnetic core run across the two air gaps axially.

According to one embodiment, the distance of the axial separation in the two air gaps is substantially constant as the rotor and/or the first magnetic core expands radially when the rotating system rotates at a high speed.

According to one embodiment, said first L-shaped cross section has a first leg part extending substantially in the axial direction and a first back part extending substantially in the radial direction towards the axis of rotation, and said second L-shaped cross section having a second leg part substantially extending in the axial direction and a second back part substantially extending in the radial direction away from the axis of rotation. Preferably, the first leg part faces the second leg part in the radial direction and the first back part faces the second back part in the axial direction.

The geometrical arrangement of the first and second magnetic core parts, according to the illustrative embodiments above, provides a substantially stable air gap for power transfer even when the centrifugal forces may deform or stretch the rotor flange or parts affixed to the rotor flange during high speed rotation.

According to one embodiment, at least the first supporting surface is made of a high-strength material, preferably high-grade steel. Advantageously, the high-strength material provides better support against centrifugal forces than other materials with less strength.

According to one embodiment, wherein the first magnetic core part is affixed to the rotating part by a flexible type silicone elastomer for electrical applications. Advantageously, a flexible type of silicone elastomer provides some tolerance for the magnetic core part to deform or move during rotation.

According to one embodiment, wire windings are applied to at least the first and second magnetic core parts to form a first power inductor/transformer and a second power inductor/transformer, respectively, such that power is transferred between the first and second power transformers. At least some of the wire windings are preferably applied onto a surface of the first leg part, said surface facing towards the axis of rotation. Advantageously, the wire windings are also supported by the magnetic core parts and the rotor flange during rotation.

According to one embodiment, at least one first magnetic core parts comprises a plurality of first magnetic core parts arranged circumferentially about the axis of rotation and at least one second magnetic core part comprises a plurality of second magnetic core parts arranged circumferentially about the axis of rotation. Advantageously, segmented magnetic core part decreases the chance of breaking the brittle magnetic core and increases the ease of manufacturing and assembly.

According to one embodiment, a contactless data transfer system is provided. The system comprises at least a first data transfer part affixed to a rotor flange comprising a first stripline and/or microstrip conductor, said first data transfer part affixed to the rotor flange such that during rotation, the first data transfer part is pressed by centrifugal force against a first supporting surface of the rotor flange. The system further comprises at least a second data transfer part affixed to the stator flange comprising at least one second stripline and/or microstrip conductor. A first broadside of the first stripline and/or microstrip conductor radially faces a second broadside of the second stripline and/or microstrip conductor such that an electric field is formed across the air gap between first and second stripline and/or microstrip conductor. The striplines and/or microstrips form a transmitter and a receiver pair for transmitting data contactlessly. The use of an annular broadside data transmission line allows bi-directional data transfer up to 100 Mbit/s at very high rotational speeds.

According to one embodiment, the air gap separates the first and second stripline and/or microstrip conductors radially and extends axially. The configuration and orientation of the striplines and/or microstrips advantageously provide a stable air gap across the stripline and/or microstrip conductors.

According to one embodiment, the first data transfer part further comprises a first insulating substrate between the first stripline and/or microstrip conductor and the rotor flange, and a second insulating substrate between the second stripline and/or microstrip conductor and the stator flange.

According to one embodiment, the electric field lines of the electric field run substantially radially across the air gap.

According to one embodiment, data is transferred at least capacitively between the first stripline and/or microstrip conductor (or capacitor plate) and the second stripline and/or microstrip conductor (or capacitor plate).

According to one embodiment, the first data transfer part is disposed farther away from the axis of rotation than the second data transfer part. Advantageously, the first data transfer part is supported by the rotor flange during rotation.

According to one embodiment, the first data transfer part comprises a third stripline and/or microstrip conductor and the second data transfer part comprises a fourth stripline and/or microstrip conductor. Further stripline and/or microstrip pairs may be provided. The first and third stripline and/or microstrip conductors are configured to receive or transmit a first differential signal. The second and fourth stripline and/or microstrip conductors are configured to receive or transmit a second differential signal. Advantageously, differential signals provide better noise immunity.

According to one embodiment, a third data transfer part affixed to rotor flange having at least one stripline and/or microstrip conductor. Further, a fourth data transfer part affixed to the stator flange having at least one stripline and/or microstrip conductor. The first data transfer part and the second data transfer part may provide a first direction of contactless data transfer, and the third data transfer part and the fourth data transfer part provide a second direction of contactless data transfer. Advantageously, bidirectional data transfer is provided. One skilled in the art would appreciate that further stripline and/or microstrip pairs may be provided for further channels of data transfer.

In an embodiment, said stator flange may comprise a first stator ridge and a second stator ridge, said first and second stator ridge forming an first and second annular support surface respectively, said first stator ridge comprising an outer surface having one or more electrical stator elements mounted thereon and said second stator ridge comprising an outer surface having one or more magnetic stator elements mounted thereon; wherein said rotor flange comprises a first and second rotor ridge forming a first and second annular support surface respectively, said first rotor ridge comprising an inner surface having one or more electrical rotor elements mounted thereon and said second rotor ridge comprising an inner surface having one or more magnetic rotor elements mounted thereon; wherein at least part of said outer surface of said first and second stator ridge is radially facing at least part of said inner surface of said first and second rotor ridge respectively such that such that contactless electromagnetic coupling between said stator and said rotor elements is achieved. In a further embodiment, said first and second stator ridges and said stator and rotor flange may be configured to form a first and second enclosure for forming a first and second housing for said electric and magnetic elements respectively for shielding said elements from external influences. The flanges and the ridges of the stator and the rotor assembly be arranged with respect to each other such that contactless data and power transfer between the magnetic and electrical elements respectively is achieved while at the same time the flanges and ridges form a secure housing for the elements that may (electrically) shield the elements from external influences.

According to one embodiment, the rotor flange further comprises a supporting substrate for holding the first data transfer part and/or the third data transfer part within the rotating part. The supporting substrate provides structural support for the data transfer parts during rotation.

According to one embodiment, the first data transfer part is configured to transmit data to the second data transfer part. Further, the third data transfer part is configured to receive data from the fourth data transfer part.

According to one embodiment, the first and/or fourth data transfer parts are more exposed to air than the second and/or third data transfer parts. Exposure to air may cause signal interference and/or noise on the signal being transmitted/received.

According to one embodiment, the first and fourth data transfer parts are more electromagnetically shielded by the rotating part or the stationary part than the second and third data transfer parts. The shielding effect on the striplines and/or microstrips receiving data may be provided based on the positioning of the striplines and/or microstrips in relation to the rotor flange and/or stator flange (in relative terms when compared to the other striplines and/or microstrips which are transmitting data). For instance, when a stripline and/or microstrip is closer to the flange and/or less exposed to air, then that stripline and/or microstrip is more shielded.

According to one embodiment, the data the third data transfer part and/or the second data transfer parts are more immune to noise than the first and/or third data transfer parts. The immunity to noise for the third and second data transfer parts may be due to their positioning or their reduced exposure to air. Advantageously, the third and second data transfer parts, being used for receiving signals, benefits more greatly from noise immunity than the first and and third data transfer parts (which are used for transmitting signals).

According to one embodiment, the first and second data transfer parts are configured to contactlessly transfer sensor data between the rotor flange and the stator flange between the first and second stripline and/or microstrip conductors, said sensor data collected by a collected by a data acquisition part in a rotating part of the system. Likewise, according to one embodiment, the third and fourth data transfer parts are configured to contactlessly transfer sensor data between the rotor flange and the stator flange between the first and second stripline and/or microstrip conductors, said sensor data collected by a collected by a data acquisition part in a rotating part of the system. Besides sensor data, it is also possible to use any of the pairs of striplines and/or microstrips to transmit control signals, such as signals to drive the data acquisition part.

Although the embodiments of the contactless data and/or power transfer systems are used with a rotor flange and a stator flange, it is understood by one skilled in the art that any parts of the contactless data and/or power transfer system may be affixed to a rotating part and/or a stationary part of a rotating system (without the use of flange(s)).

The disclosed embodiments will further be illustrated with reference to the attached drawings, which schematically show embodiments according to the invention. It will be understood that the invention is not in any way restricted to these specific embodiments.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

Aspects of the invention will be explained in greater detail by reference to exemplary embodiments shown in the drawings, in which:

FIGS. 10A-B depict illustrative cross sections of a rotor position sensing assembly and a corresponding block diagram of the rotor position system, according to one embodiment of the invention.

DETAILED DESCRIPTION

Figure 1:
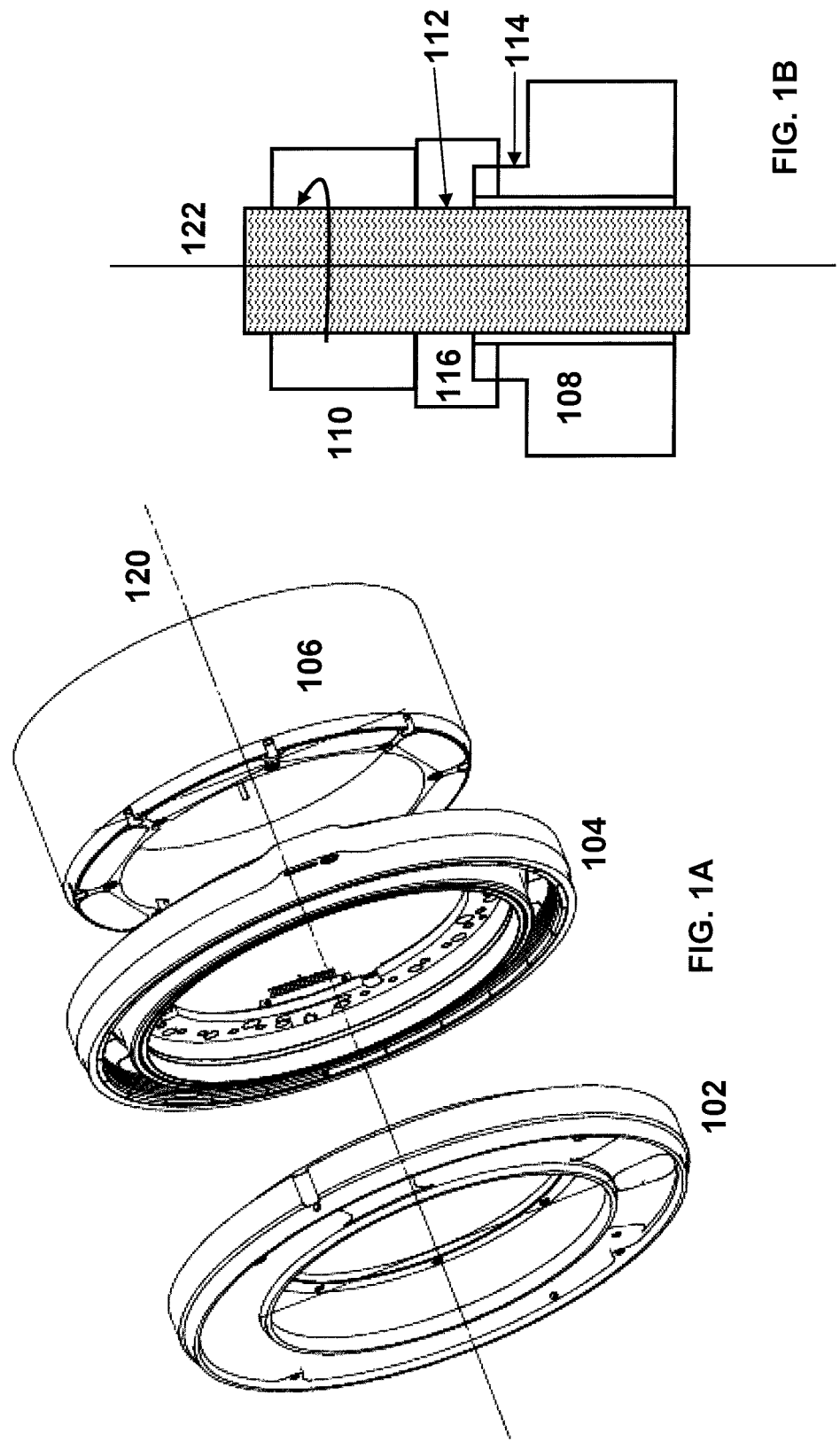
FIG. 1A depicts an exemplary data and power transfer system, according to one embodiment of the disclosure.
FIG. 1B depicts an exemplary rotating system and flanges, according to one embodiment of the disclosure.

FIG. 1A depicts an exemplary contactless data and/or power transfer system according to one embodiment of the disclosure. The system may comprise a stator flange assembly 102, a rotor flange assembly 104, and, optionally, a rotor module housing 106. The rotor flange assembly and the stator flange assembly may move relative to each other in a rotating manner around axis 120. The stator flange assembly may be removably mounted onto a stator part and the rotor flange assembly may be removably mounted on a rotor part using suitable fastening means. Both flange assemblies may comprise one or more ridges (rims) wherein each ridge comprises a cylindrical surface for mounting and supporting electrical and/or mechanical components for the contactless data and power transfer system.

FIG. 1B schematically depicts a cross-section of the contactless data and/or power transfer system comprising a stator flange assembly 114 mounted to a stator part 108 and the rotor flange assembly 116 mounted on a rotor shaft 112 (e.g. a through-bore rotating shaft which rotates about an axis of rotation 122). In operation, the rotor and rotor flange assemblies may be brought in close proximity to each other such that the electrical components mounted on the ridges, are able to exchange data and/or power in a contactless manner. As will be described hereunder in more detail, the flange assemblies allow the design of a contactless data and/or power transfer system that is compact and modular. By simply adapting the diameter of the flanges the system can be mounted to a variety of different rotor-stator systems. Furthermore, the flanges may be configured to provide a secure housing for the electronics.

In this disclosure, the contactless data and/or power transfer system may be used in a wind tunnel rotor or propeller model to excite sensors and/or gather signals from sensor(s) located in the rotating part. It is understood by one skilled in the art that the contactless data and/or power systems described in this application are usable in any type of high-speed stator-rotor system. For instance, the rotating system and the parts therein may be used in full-scale propellers or rotors, such as airborne or wind turbine blades, all in a through-bore or shaft-end type of application.

Figure 2:
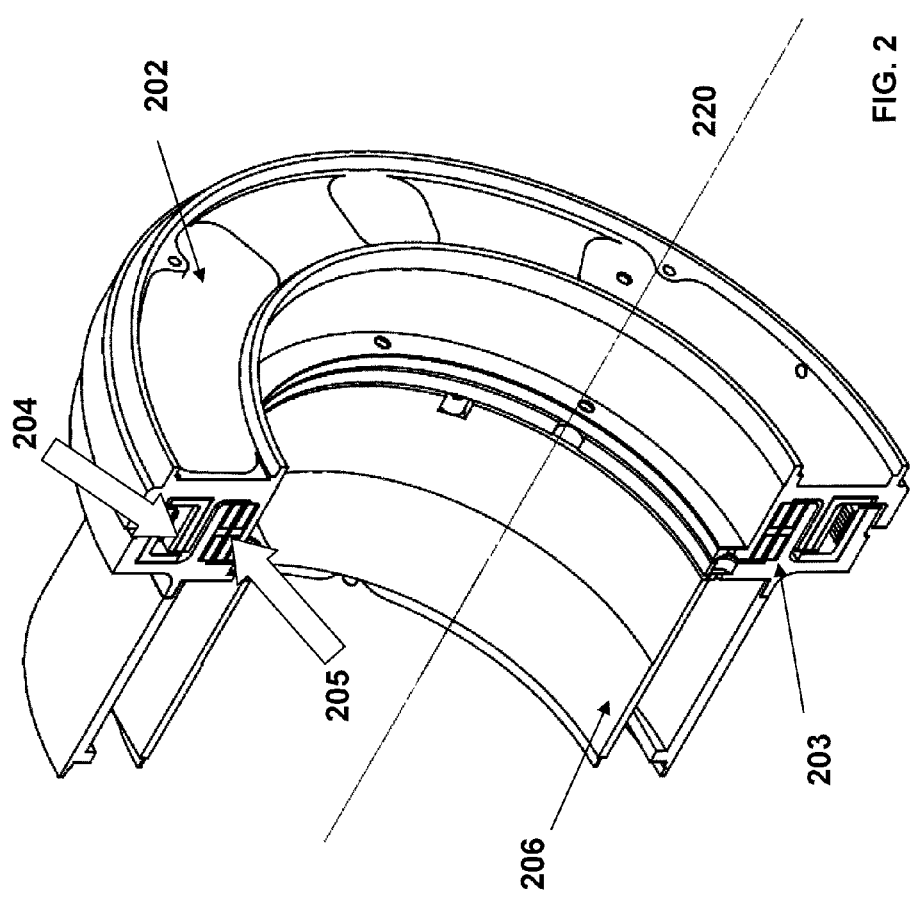
FIG. 2 depicts an illustrative cross section of a rotor flange assembly and a stator flange assembly, according to one embodiment of the disclosure.

When the parts of FIG. 1A or FIG. 1B are engaged together, the resulting system is shown in FIG. 2. FIG. 2 depicts an illustrative cross-section of a rotor-stator flange assembly comprising a contactless power and/or data transmission system according to one embodiment of the disclosure. The stator flange assembly 202 is disposed in close proximity to rotor flange assembly 203, which are configured to rotate relative to each other around axis 220. A rotor module housing 206 may be removably fixed to the rotor flange assembly. When disposed in close proximity of each other, the stator flange assembly 202 and the rotor flange assembly 203 may define a substantially enclosed and/or shielded enclosure (or housing) for the power transfer part 204 and/or a data transfer part 205. Furthermore, ridges forming the enclosure may provide mechanical support to the parts during high-speed rotation.

Figure 3:
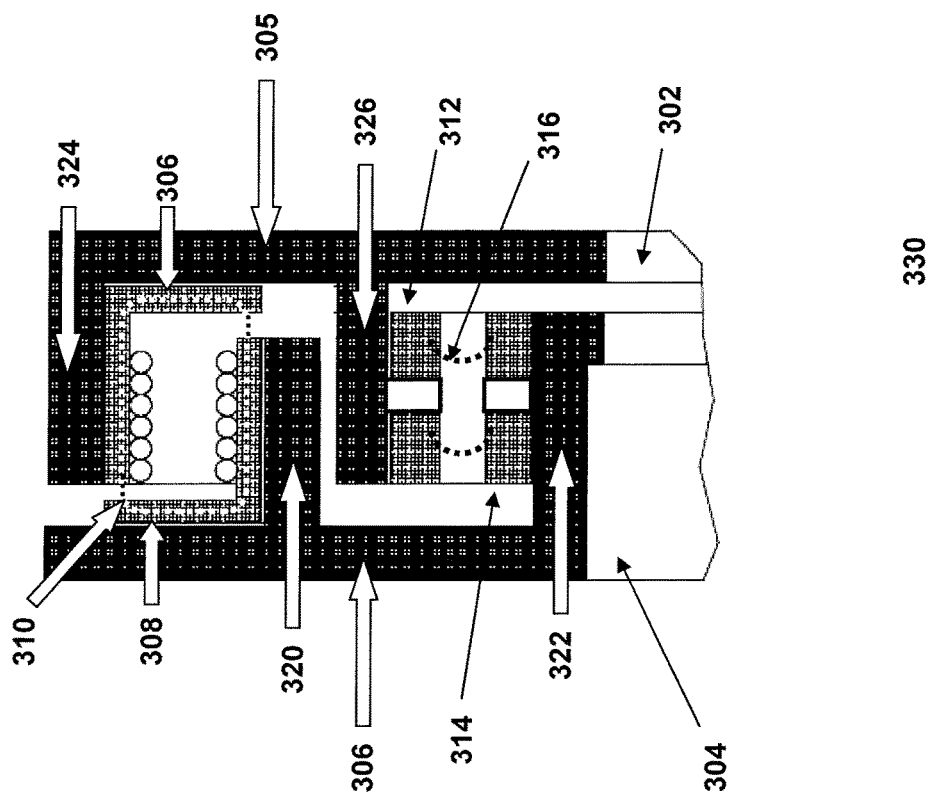
FIG. 3 depicts an illustrative cross section of the power transfer and data transfer assemblies, according to one embodiment of the disclosure.

FIG. 3 depicts a more detailed cross-section of rotor and stator flange for supporting a contactless power and/or data transmission system according to one embodiment of the disclosure. The cross-section shows a rotor flange 302 configured to rotate relative to a stator flange 304 around axis 330. The rotor flange and/or the stator flange is preferably made of high-strength material, e.g. high-grade steel, which is able to withstand the mechanical stress from the high centrifugal forces.

The rotor flange may comprise a radially extending rotor flange portion 305. The rotor flange may further comprise at least one of: a first rotor ridge 324 and a second rotor ridge 326 wherein the first and second rotor ridges extend away from the radially extending rotor flange portion in the axial direction and form annular (cylindrical) support surfaces with different radii. The rotor ridge(s) may be used for mounting and supporting the electric and/or magnetic elements, which are part of the contactless data and/or power transfer electronics at the rotor-side. The support surface of a ridge may form a circumferential surface, preferably a cylindrical surface, of a predetermined radius and width. Hence, the supporting surface may form an annular surface extending circularly around the flange. Electric and/or magnetic elements may be mounted on the ridge such that at high-speed rotation, the support surface works against the centrifugal forces experienced by the electric and/or magnetic elements.

Similarly, the stator flange 304 may comprise a radially extending stator flange portion 306. The stator flange may further comprise at least one of: a first stator ridge 320 and a second stator ridge 322 wherein the first and second stator ridges extend away from the radially extending stator flange portion in the axial direction and form two annular support surfaces of different radii. The one or more stator ridges may be used for mounting and supporting the electric and/or magnetic elements, which are part of the contactless data and/or power transfer electronics at the stator side.

When disposing the stator and rotor flanges in close proximity to each other, the stator and rotor ridges may be arranged in an interdigitated way so that the outer support surface of the first stator ridge radially faces the inner support surface of the first rotor ridge. These surfaces are used to support one or more magnetic cores for forming part of a contactless rotating transformer system and to support one or more striplines and/or microstrips for forming a contactless rotating data transmission and receiver system. Furthermore, the interdigitated arrangement of the stator and rotor ridges provides the effect that an enclosure is formed in which the electric and/or magnetic elements are securely housed and shielded from external influences as described in relation to FIG. 2.

As can be seen in FIG. 3, the rotor flange assembly is aligned with the stator flange assembly about the rotational axis 330 so that the rotor flange assembly may rotate about the rotation axis relative to the stator flange assembly. The radii and widths of the ridges of the stator and rotor flange are selected such that—when positioned closely to each other—a first support surface of a stator ridge radially faces a second support surface of a rotor ridge. The distance between the facing first and second support surfaces may be controlled by the radius of the stator ridge and the radius of the rotor ridge. The distance may be selected such that contactless exchange of data and power signals between the electrical components mounted on the stator and rotor ridges is possible.

Different ridges of the stator and rotor may support different functional electronics. For example, a first stator ridge and a first rotor ridge, which radially faces the first stator ridge, may be configured to support magnetic power transfer elements, i.e. magnetic cores for achieving contactless power transfer between the rotor and the stator. Similarly, a second stator ridge and second rotor ridge, which radially faces the second stator ridge, may be configured to support electrical data transfer elements, i.e. one or more striplines and/or microstrips, for achieving contactless data transfer between the rotor and the stator.

The material of the rotor flange and/or stator flange may provide structural support for the data and/or power transfer electronics such that the rotor flange assembly can withstand high levels of mechanical stress under high centrifugal forces. Furthermore, the rotor and stator flanges may form a protective housing for shielding the data and/or power transfer electronics from external noise sources. Further, a rotor module housing may comprise circuitry for data and/or power handling, wherein the circuitry is communicably connected to the data transfer part and/or the power transfer part of the rotor flange assembly. Although FIG. 3 depicts the stator and rotor flange assemblies which houses both a contactless power and a contactless data transfer system, one skilled in the art would appreciate that the flange assemblies are also suitable for housing an individual contactless power transfer system or data transfer system.

In order to form a contactless power transmission system, one or more stator magnetic core parts 308 may be mounted on the outer support surface of the first stator ridge and on the radial stator flange part. Similarly, one or more rotor magnetic core parts 306 may be mounted on the inner support surface of the first stator ridge and the radial rotor flange part. This way, a plurality of said first and second magnetic core parts may be arranged circumferentially about the axis of rotation.

In one embodiment, stator and rotor magnetic core parts may be L-shaped. As shown in FIG. 3, the L-shaped rotor and stator cores may be arranged on the support surfaces of the first rotor and stator ridges so that a substantially rectangular magnetic core with two small air gaps so that the magnetic field lines may form a closed path 310. In particular, a longer part of the L-shaped magnetic core part may be arranged on the support surfaces of the first rotor and stator ridges 324,320 and the short part of the L-shaped magnetic core part may be arranged against the axially extending rotor and stator flange portions 305,306. In this arrangement, all parts of the magnetic core are pressed against the rotor ridge so that damage to the relatively brittle magnetic core parts due to the high g-forces is minimized.

Further, in an embodiment, the rotor and stator transformer coils may be arranged (i.e. wound) on the rotor and stator core parts respectively, in particular on the longer part of the L-shaped magnetic core parts which are in contact with the support surfaces of the first rotor and stator ridges. This way, when rotating at high speeds, the rotor transformer coils are pressed against the magnetic core parts by the centrifugal force thereby forming a transformer structure which can withstand high g-forces. The first stator and rotor ridges comprising the circumferentially arranged L-shaped magnetic core parts may thus form a toroidal and/or annular rotating transformer configured to inductively transfer power from the stator to the rotor.

The rotor and stator cores may comprise a material with high magnetic permeability, e.g., a ferrite ceramic compound. In an embodiment, the rotor core and/or the stator core may comprise a ferrite material. The use of a ferrite allows high-efficiency magnetic coupling at elevated frequencies. Ferrites that are used in transformer or electromagnetic cores may include nickel, zinc, and/or manganese compounds. They have a low coercivity and sometimes referred to as soft ferrites. The low coercivity means the material's magnetization can easily reverse direction without dissipating much energy (hysteresis losses), while the material's high electrical resistivity prevents eddy currents in the core, another source of energy loss.

In one embodiment, the rotor and stator ridges supporting the cores are made of a substantially non-ferromagnetic material. The rotor and stator magnetic cores, each having an L-shaped cross-section, are arranged to engage or be disposed in proximity to each other to form a substantially rectangular arrangement. The geometrical arrangement creates a magnetic field where the magnetic coupling path 310 (dotted line) passes through the two small air gaps between the rotor core and the stator core. Further details and advantages of said power transfer assembly are discussed in detail in relation to FIG. 4.

In order to form a contactless data transmission system, one or more annular stator stripline and/or microstrip parts 314 may be mounted on the outer support surface of the second stator ridge and on a radial stator flange part. Similarly, one or more annular rotor stripline and/or microstrip parts 312 may be mounted on the inner support surface of the second rotor ridge and the radially extending rotor flange part. This way, rotor stripline and/or microstrip parts are arranged in close vicinity to the stator stripline and/or microstrip parts so that the two facing striplines or microstrips form a pair of broadside-coupled striplines or microstrips separated by a small air gap. The second stator and rotor ridges form an annular rotating data transfer interface allowing data to be electromagnetically transferred from the stator to the rotor by means of an electromagnetic coupling path 316 (dotted lines). In this arrangement, the rotor striplines are pressed against the rotor ridge so that damage due to the high g-forces is minimized. Further details and advantages of the data transfer assembly are discussed in detail in relation to FIG. 7.

One skilled in the art shall appreciate that if only a contactless data transfer part or power transfer part is needed, the rotor and stator flange may be configured with a single rotor and stator ridge in order to mount the magnetic or electric elements. In that case, the flange may be configured with a L-shaped or T-shaped cross section. In other embodiments, flanges with other cross-sectional shapes may be used for providing cylindrical support surfaces, e.g. E, W, or U-shaped cross-sections.

Figure 4:
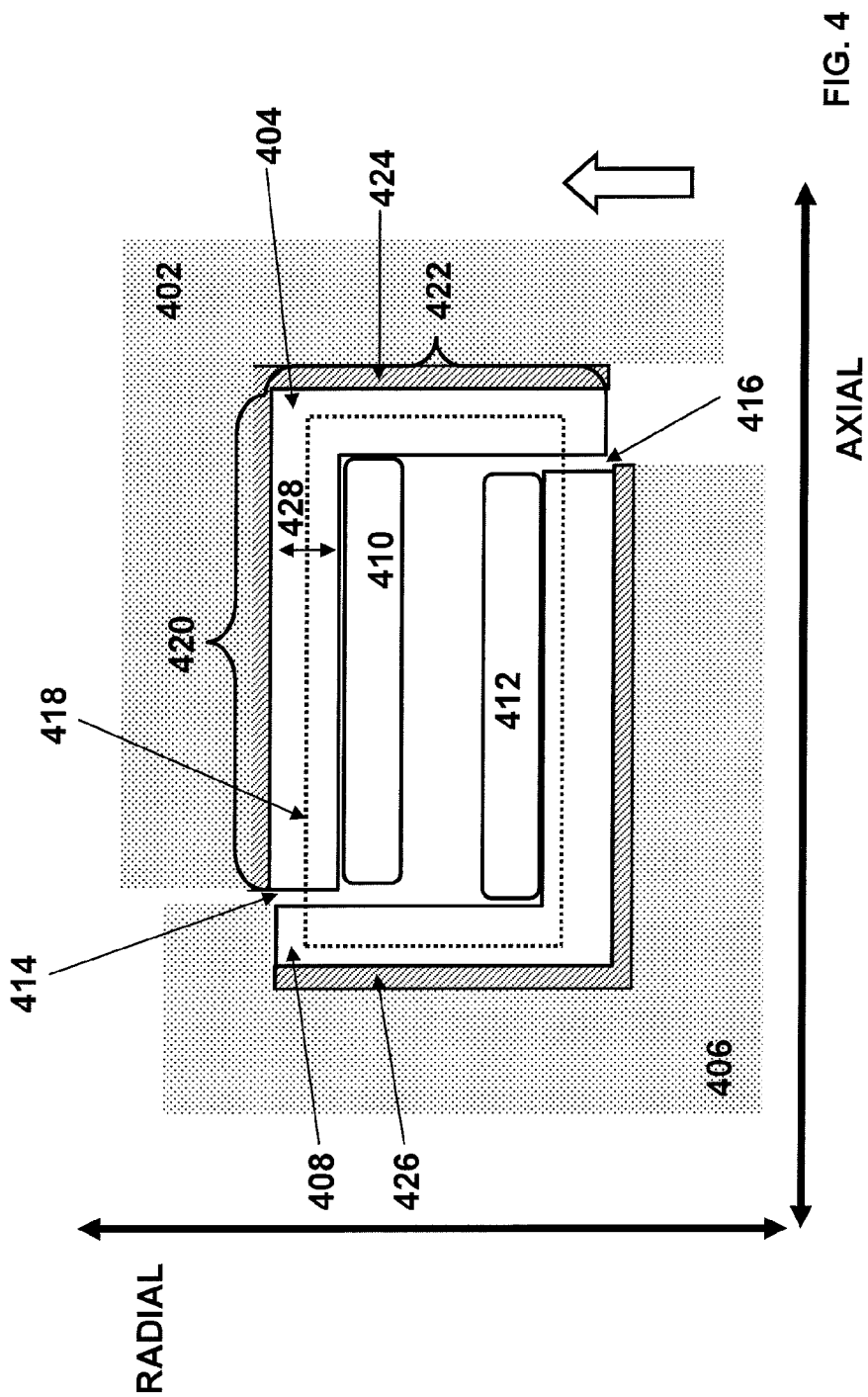
FIG. 4 depicts an illustrative cross section of the power transfer assembly, according to one embodiment of the disclosure.

FIG. 4 depicts a schematic cross-section of at least part of a contactless power transfer system according to one embodiment of the disclosure. The power transfer system may use a rotating transformer in order to transfer power from the stator to the rotor. A rotor part 402 (e.g. a rotor flange comprising a radially extending rotor flange part and a rotor ridge) may support at least one rotor magnetic core part 404 with high magnetic permeability, which has an L-shaped cross section. The rotor magnetic core may be affixed to the rotor part. Similarly, a stator part 406 (e.g. a stator flange comprising a radially extending stator flange part and a stator ridge) supports a magnetically conductive stator core 408, which has an L-shaped cross section. The stator core is affixed to the stator part.

An L-shaped rotor core part may comprise a leg part extending axially along the inner surface of the rotor ridge and back part extending along the radially extending rotor flange part. Similarly, an L-shaped stator core part may comprise a leg part extending axially along the outer surface of the stator ridge and a back part extending radially along the radially extending stator flange part. In the shown configuration, the leg parts face each other in the radial direction and the back parts face each other in the axial direction. Windings 410 and 412 may be wound along the cores. As shown, windings 410 are applied against a surface of the leg parts of the rotor core parts. Also, windings 412 are applied against a surface of the leg parts of the stator core parts.

Hence, the L-shaped stator and rotor cores may be located proximate to each other wherein the end of the L-shape geometry of the rotor core is positioned closely next to the ends of the L-shaped geometry of the stator core to form two air gaps. In an embodiment, an air gap may be formed by the outer end of a leg part of a stator core and a part of the back part of the rotor core. In another embodiment, an air gap may be formed by the outer end of a leg part of the rotor core and a part of the back part of the stator core. The cores are arranged such that the magnetic field lines of the cores form a closed loop. For instance, a magnetic coupling path 418 is formed, and said path passes through the two small air gaps.

According to an embodiment, the cores may be positioned to form two air gaps 414 and 416, wherein each air gap separates the two magnetic cores axially and extends radially. As such, the magnetic field lines run across the air gaps in the axial direction. Generally, the distance across the air gaps between the cores affects the strength of the magnetic field. Because the air gaps separate the two cores in the axial direction, the distance of the separation advantageously remains substantially constant and is hardly influenced by structural changes of the rotor due to radial mechanical displacement at very high rotational speeds.

In one embodiment, the cores may comprise a Manganese-Zinc (MnZn) ferrite ceramic material. In another embodiment, the magnetic cores and/or striplines and/or microstrips may be affixed to the rotor and/or stator flange(s) using a silicone elastomer, which may mechanically damp stress and/or vibrations during high-speed rotation of the rotor. In yet another embodiment, a magnetic core may comprise an L-shaped cross section. L-shaped stator and rotor magnetic cores are more simple to fabricate, easier to handle and mechanically more stable at high rotational speeds when compared with C-, U-, or E-shaped core.

Under high centrifugal forces, the rotor and stator magnetic cores may stretch as forces are applied to the core in the radial (outward) direction. Furthermore, the windings of the core may be pushed against the core with a high amount of force under high centrifugal acceleration. To improve the ability of the brittle magnetic core parts to remain intact under high centrifugal acceleration (e.g., accelerations up to 5500 g) of the rotor, the rotor flange and rotor magnetic cores are designed and arranged to withstand high mechanical stress by affixing L-shaped magnetic cores to the inner surface of the rotor ridge and affixing the coil windings against the L-shaped magnetic cores such that both the cores and the windings are pressed against the mechanically stable rotor ridge. This way a rotor transformer structure is achieved which is very stable at very high rotary speeds.

Under high mechanical stress, even a high-strength rotor flange may stretch/expand in size. For instance, a rotor flange made of high-grade steel, under centrifugal acceleration of 5500 g, may stretch about one or more $10^{th}$ of a millimeter, depending on the physical size of the rotor and/or stator. To dampen the stress on the ferrite, caused by the expansion of the rotor flange, the rotor core may be affixed to the rotor flange using a flexible type of bonding compound 424. A silicone elastomer may be used. The stator core may also be affixed to the stator part using a flexible type of bonding compound 426. Accordingly, the air gaps are able to withstand small movements in both the radial and the axial directions of the rotor and the stator.

The L-shaped geometry of the core provides a structure that is less prone to breaking and/or tearing than cores with a C-, U-, or E-shaped cross sections, because the L-shaped geometry of the core has only one single leg extending (at approximately or substantially 90 degree angle) from the back part 422 of the L-shaped geometry of the core. Said back part may be affixed to the rotor flange. Furthermore, the single leg is firmly supported by the rotor flange. In contrast, the C-, U-, or E-shaped cores have a plurality of legs, which increase the number of weak points in which the brittle core may break and/or tear.

The shaft diameter and the required rotational speed of the application determine the centrifugal force that will act on the transformer components. The actual centrifugal force may then be a figure on which the dimensions of the L-shape ferrite and the rotor flange are be designed. The distance of the air gap should be kept to a minimum, for instance around 1 mm.

The power and/or data transfer part(s) may be affixed to the rotor and/or stator flange(s) using a flexible type of silicone elastomer, which provides a cushioning function for the power and/or data transfer part against relatively small movements caused by mechanical stress in the radial and/or axial direction. The silicone elastomer for affixing the power and/or data transfer part may be applied through a special bonding process using the aforementioned bonding compound. A mould may be applied to precisely fix the ferrite elements at the correct distance with respect to the flange during the curing process. This mould allows application of a defined amount of bonding compound between the ferrite elements and the flange.

Generally, the rotor part supports a plurality of (segmented) rotor magnetic core parts arranged circumferentially to provide a power transformer. In a similar manner, the stator part also supports a plurality of (segmented) stator magnetic core parts arranged circumferentially to provide a power transformer. In some embodiments, the core extends in one piece forming substantially a full circle in the rotor and stator flange. The segmentation of the magnetic core in magnetic core parts improves the ease of handling and fabrication of the core. Furthermore, the segmentation of the core provides higher tolerance against breakage or tearing under high centrifugal acceleration.

The stator core is preferably assembled in a similar fashion as the rotor core. Although the embodiment is explained in relation to a rotor flange and stator flange, respectively affixable to a rotor and a stator, it is appreciated that the embodiment may be used more generally with any rotating part and stationary part of a rotating system.

Figure 5:
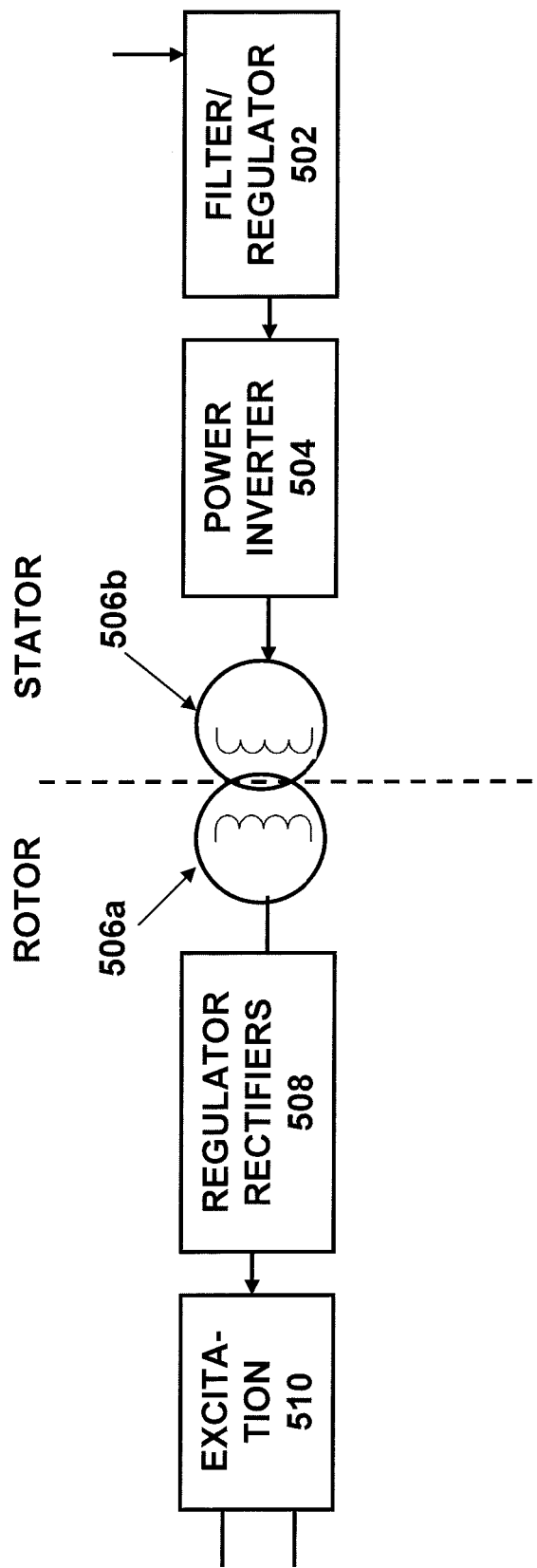
FIG. 5 depicts an illustrative block diagram of power transfer system, according to one embodiment of the invention.

FIG. 5 depicts an illustrative block diagram of power transfer system, according to one embodiment of the invention. The power transfer system may include a filter/regulator 502, and a power inverter 504 in the stator part. The filter/regulator may be configured to condition the signal provided to the power inverter, e.g., to ensure a certain substantially constant voltage is provided. The power inverter may be configured to drive/excite the rotating transformer (having a rotor transformer 506a and stator transformer 506b), at a particular frequency. The rotor transformer and the stator transformer may be provided according to the embodiments described in relation to FIG. 4. The frequency may be chosen in such a way that interference with other circuitry (such as the data transfer system) is substantially minimized. In one embodiment, the power inverter is synchronized with data acquisition module(s) of the data transfer system to prevent low-frequency intermodulation products in the sampled signals.

The power transfer system may include a regulator/rectifiers 508 and an excitation module 510 in the rotor. The filter/rectifier may be configured to condition the signal provided to the excitation module. The excitation module is configured to excite components within the rotor that require power, such as sensors.

Figure 6:
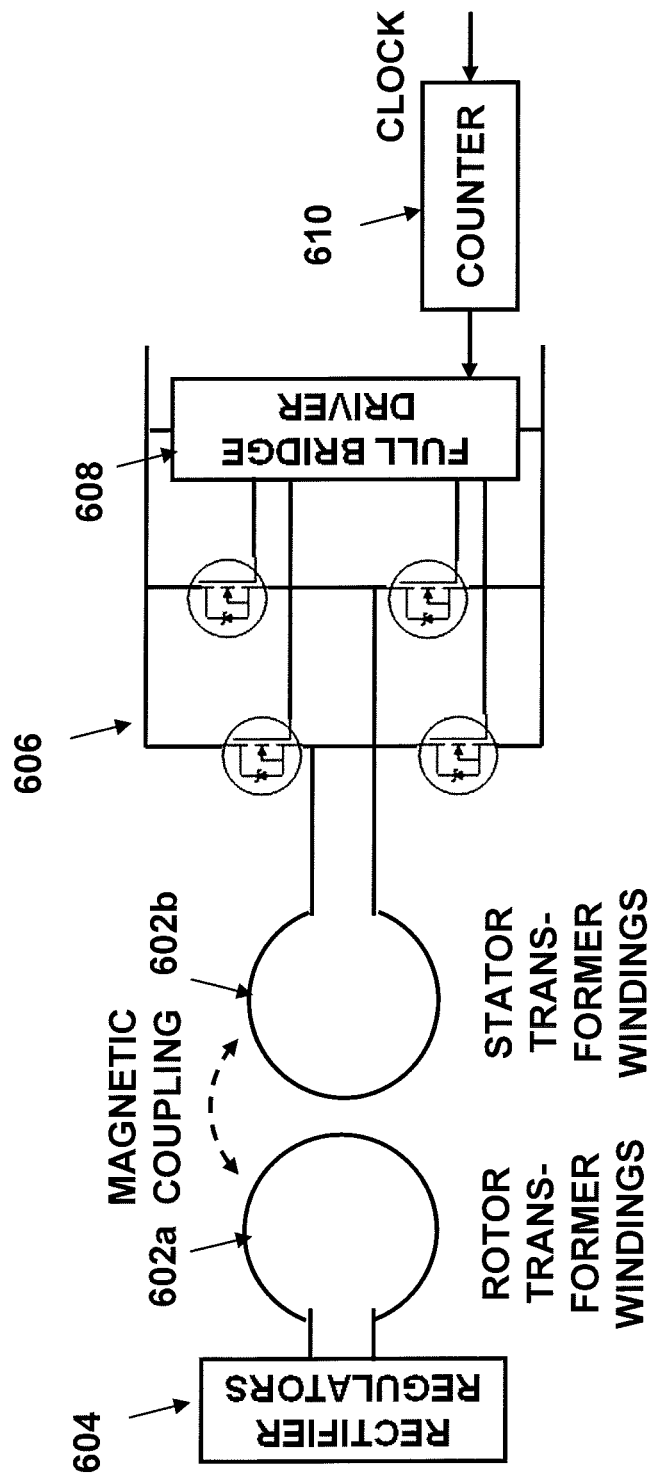
FIG. 6 depicts an illustrative schematic diagram of a power transfer system, according to one embodiment of the disclosure.

FIG. 6 depicts an illustrative schematic diagram of a power transfer system, according to one embodiment of the disclosure. The power transfer system includes rotor transformer windings 602a and stator transformer windings 602b, wherein the windings are magnetically coupled. The rotor transformer windings and the stator transformer windings may be provided according to the embodiments described in relation to FIG. 4. For clarity purposes, the transformer windings are shown as one circle and the core elements are not shown. Similar to FIG. 5, the rotor transformer windings are coupled to a rectifier/regulator module 604, which may be configured to condition the power delivered to components in the rotor.

The power transfer system may include a plurality of metal-oxide-semiconductor field-effect transistors 606 (MOSFETs) configured to drive the stator transformer winding. The MOSFETS may be controlled by a full bridge driver integrated circuit 608. For instance, the full bridge driver integrated circuit may be a switch-mode driver configured to run the transformer at a particular frequency, e.g., in the range between 50 to 200 kHz.

The full bridge driver integrated circuit may be communicably connected to a counter 610, which receives input from a system clock. In one embodiment, the same system clock is also provided to the rotor to control the analogue to digital conversion occurring in the data acquisition module(s) of the data transfer system. Advantageously, the use of the same system clock ensures that less impact is made on the signals acquired in the rotor. In this way, the switching frequency and the harmonics may be made to fall in notches of the data acquisition filters. This may reduce the signal input noise and thus enhances the analogue to digital sampling accuracy. The power transfer system allows to efficiently (i.e more than 80%) transfer up to 20 W power to the rotating sensors and circuitry.

Although the figure shows a power transfer system for transferring power from the stator to the rotor, it is appreciated that the power may also be transferred in the opposite direction from the rotor to the stator, using the design shown by replacing the parts in the rotor with the parts in the stator and vice versa.

Figure 7:
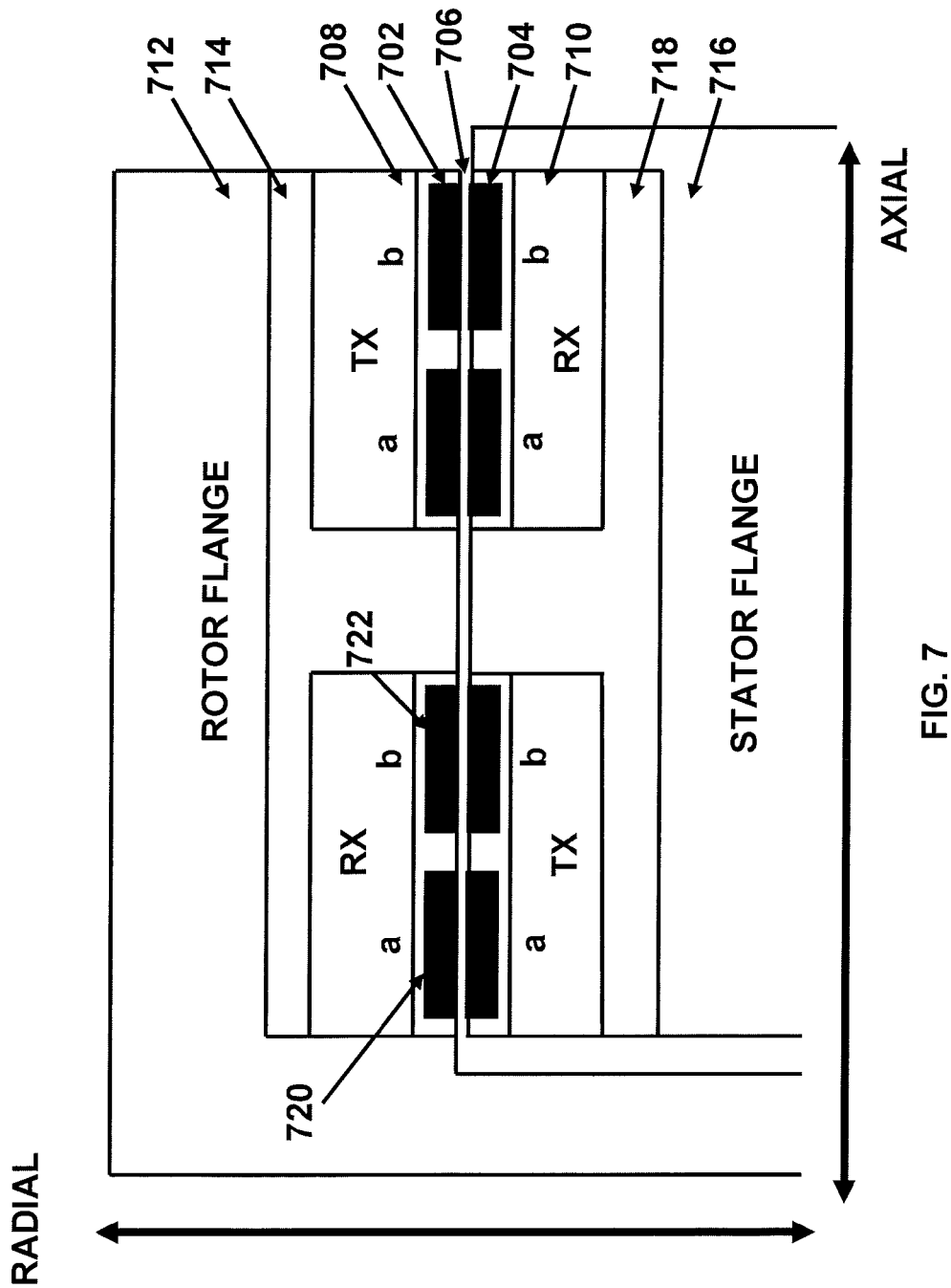
FIG. 7 depicts an illustrative cross section of a data transfer assembly, according to one embodiment of the disclosure.

FIG. 7 depicts an illustrative cross section of a data transfer assembly, according to one embodiment of the disclosure. A first data transfer part of the assembly is affixed to the rotor flange, and a second data transfer part of the assembly is affixed to the stator flange. The first and second data transfer parts are disposed closely to each other to form an air gap between each other. Each data transfer assembly part comprises at least one stripline and/or microstrip conductor. The stripline and/or microstrip conductor extends substantially circumferentially on the rotor and/or stator.

Across the air gap, an electromagnetic coupling path is formed between data transfer parts, where data is transmitted between broadside-coupled striplines and/or microstrips, in a uni- or bi-directional manner. One stripline and/or microstrip of a data transfer part faces another stripline and/or microstrip of another data transfer part along the broadside of the striplines and/or microstrips, such that an electric field is formed across the air gap between the opposing striplines and/or microstrips. The stripline and/or microstrip is made of a conductive material.

According to an aspect, the air gap between the opposing striplines and/or microstrips separates the striplines and/or microstrips radially and extends axially. As such, the electric field lines of the electric field run substantially radially across the air gap. The configuration may be particularly advantageous for a through bore relatively large shaft.

In some embodiments, the air gap opposing striplines and/or microstrips separates the striplines and/or microstrips axially, wherein the striplines and/or microstrips are orientated in a radial plane. However, an radial separation may be preferred because the radial support against centrifugal forces is absent. Furthermore, the two striplines and/or microstrips, required for differential signal transmission, would have unequal radii and thus unequal lengths. This may deteriorates the transferred signal quality.

According to another aspect, the data transfer part affixed to the rotor is disposed farther away from the axis of rotation than the data transfer part of the stator.

Advantageously, the rotor is provided with room to expand outwards during rotation without the risk of rubbing against the striplines and/or microstrips of the stator part.

In some embodiments, data signals (e.g., acquired by a data acquisition module(s) of the data transfer system) may be transmitted from the rotor to the stator through the coupling path formed across the air gap. Control signals (e.g., clock or synchronization signals) may be transmitted from the stator to the rotor to control modules in the rotor (e.g., data acquisition module(s)).

According to one aspect of the disclosure, a pair of striplines and/or microstrips, one stripline and/or microstrip on the rotor and the other stripline and/or microstrip on the stator forms a data transmission line. The pair of striplines and/or microstrips is disposed closely to each other to form an electromagnetic coupling path across an air gap between the striplines and/or microstrips. Accordingly, data may be transferred through the electromagnetic coupling path in a contactless manner. For instance, stripline and/or microstrip 702 and stripline and/or microstrip 704 are disposed closely to each other to form an air gap 706. As such, the electromagnetic coupling path is formed across the air gap. In the embodiment shown, the air gap separates the striplines and/or microstrips radially and extends axially.

The dimension of the shaft diameter and the required rotational speed of the application may determine the centrifugal force that will act on the transformer components. The actual centrifugal force may then be a figure on which the dimensions of the L-shape ferrite and the rotor flange are be designed. The thickness of the air gap should be kept to a minimum, for instance approximately 1 mm.

Depending on the application, one or more pairs of striplines and/or microstrips may be used. For instance, in some embodiments, two striplines and/or microstrips are provided for transmitting a differential signal. For instance, striplines and/or microstrips 720 and 722 may be used to transmit differential signals. Preferably, the plurality of striplines and/or microstrips used for transmitting complementary signals in a differential signal are of the same size (dimension and length) to avoid signal skew between the complementary signals. Similarly, the plurality of striplines and/or microstrips used for receiving complementary signals are of the same size as well.

Generally, striplines and/or microstrips are disposed on a dielectric, and said dielectric is fixed to a ground plane. A pair of striplines and/or microstrips forms an advantageous transmission line when the striplines and/or microstrips are placed closely, facing each other along the broadside of the stripline and/or microstrip.

To form the broadside-coupled striplines and/or microstrips, a data transfer part further comprises an insulator ring onto which at least one stripline and/or microstrip is mounted. For instance, stripline and/or microstrip 702 is mounted onto an insulating substrate, e.g., an insulator ring 708. The insulating substrate acts as the dielectric part of the broadside-coupled striplines and/or microstrips. Likewise, stripline and/or microstrip 704 may be mounted onto an insulator ring 710. An insulator ring is preferably made of a stable isolation material, such as Polyether ether ketone (PEEK).

In some embodiments, the stripline and/or microstrip supported by the insulator ring may be further supported by a supporting substrate, e.g., a support ring of the rotor flange. The support ring may be affixed to the rotor flange or the stator flange. For instance, a rotor flange 712 may be arranged to hold a support ring 714. The stator flange 716 may be arranged to hold a support ring 718. Advantageously, a support ring aids to hold the striplines and/or microstrips and/or the insulating substrate in place. The stator flange and/or the support ring may act as one reference plane for the striplines and/or microstrips.

The use of the support rings advantageously enables the data transfer parts to be held firmly in place on the rotor flange and stator flange, respectively, in a stable manner, such that the striplines and/or microstrips may have some tolerance against mechanical stress in the axial and radial direction. The support ring is preferably made of aluminium or copper, i.e. a low-resistance metal, such as forms a high-quality ground plane for the striplines. In some embodiments, circuitry for driving the striplines and/or microstrips is integrated into the support ring.

Under high centrifugal acceleration, the data transfer part(s) affixed to the rotor experiences a high level of force in the outward radial direction. Accordingly, under high centrifugal acceleration (e.g., 5500 g) of the rotor, the data transfer assembly is designed to withstand high mechanical stress. More specifically, the orientation and the placement of the data transfer part(s) in connection with the rotor flange provide the structural support that is needed under high centrifugal acceleration.

When the rotor rotates at high speeds, the data transfer part(s) are pushed in the outward radial direction. To increase the ability of the data transfer assembly to withstand mechanical stress, the rotor flange advantageously provides structural support to the data transfer part(s) and, optionally, the support ring as forces are applied to the rotor flange during rotation. As such, the data transfer part(s) of the rotor flange are held firmly in place.

During rotation, the data transfer part(s) of the rotor is pressed against a supporting surface of the rotor flange. The supporting surface and/or the rotor flange is preferably made of a high-strength, rigid material, such as high-grade steel, such that structural support is sufficiently provided to the striplines and/or microstrips. The structural support provided by the rotor flange advantageously ensures that the air gap between the striplines and/or microstrips is maintained at a suitable distance without being stretched too far when the rotor rotates at high speeds.

In some embodiments, a plurality of data transfer parts are affixed to the rotor flange such that one or some part(s) may be used for receiving signals and the other one or some part(s) may be used for transmitting signals. Similarly, a plurality of data transfer parts are affixed to the stator flange such that one or some part(s) may be used for receiving signals and the other one or some part(s) may be used for transmitting signals. If differential signals are used, then each data transfer part comprises at least two striplines and/or microstrips.

As seen in FIG. 7, the rotor has a receiving "RX" part and transmitting "TX" part (i.e., two data transfer parts). On the stator side, two data transfer parts are affixed to the stator, also such that one may be used for transmitting signals and the other one may be used for receiving signals. As seen in FIG. 7, the stator has a transmitting "TX" part and a receiving "RX" part facing the "RX" part and the "TX" part of the rotor, respectively. In such a configuration, data may be transferred between the stator and the rotor in a bidirectional manner. One of the opposing "RX" and "TX" parts may be used for transmitting a signal in one direction, and the other opposing "TX" and "RX" parts may be used for transmitting a different signal in the other direction.

In some embodiments, the "RX" and "TX" parts may be arranged in the data transfer assembly such that signal integrity between the rotor and the stator is substantially optimized. As seen in FIG. 7, the "TX" part of the rotor and the "TX" part of the stator are exposed to an air gap, resulting in a relatively less shielded environment. The "RX" part of the rotor and the "RX" part of the stator are placed in proximity to the rotor and stator flange, respectively. As such, the rotor flange and the stator flange shields the "RX" part, resulting in a relatively more shielded environment. Generally, signals in the "RX" part are more sensitive to external interference compared to the signals in the "TX" part. Such an arrangement advantageously provides shielding where signals are more sensitive, so that signal integrity is maintained for signals in the more sensitive "RX" part.

In some embodiments, the striplines and/or microstrips extend in one piece as substantially a full circle in the rotor flange and stator flange. In some embodiments, the striplines and/or microstrips may be segmented into a plurality of arcs in the rotor flange and stator flange. The segmentation of the striplines and/or microstrips may improve the ease of fabrication of the striplines and/or microstrips.

The stator part is preferably provided with data transfer part(s) in the same fashion as how the data transfer parts are provided with the rotor part. Although the embodiment is explained in relation to a rotor flange and stator flange, respectively affixable to a rotor and a stator, it is appreciated that the embodiment may be used more generally with any rotating part and stationary part of a rotating system.

Figure 8:
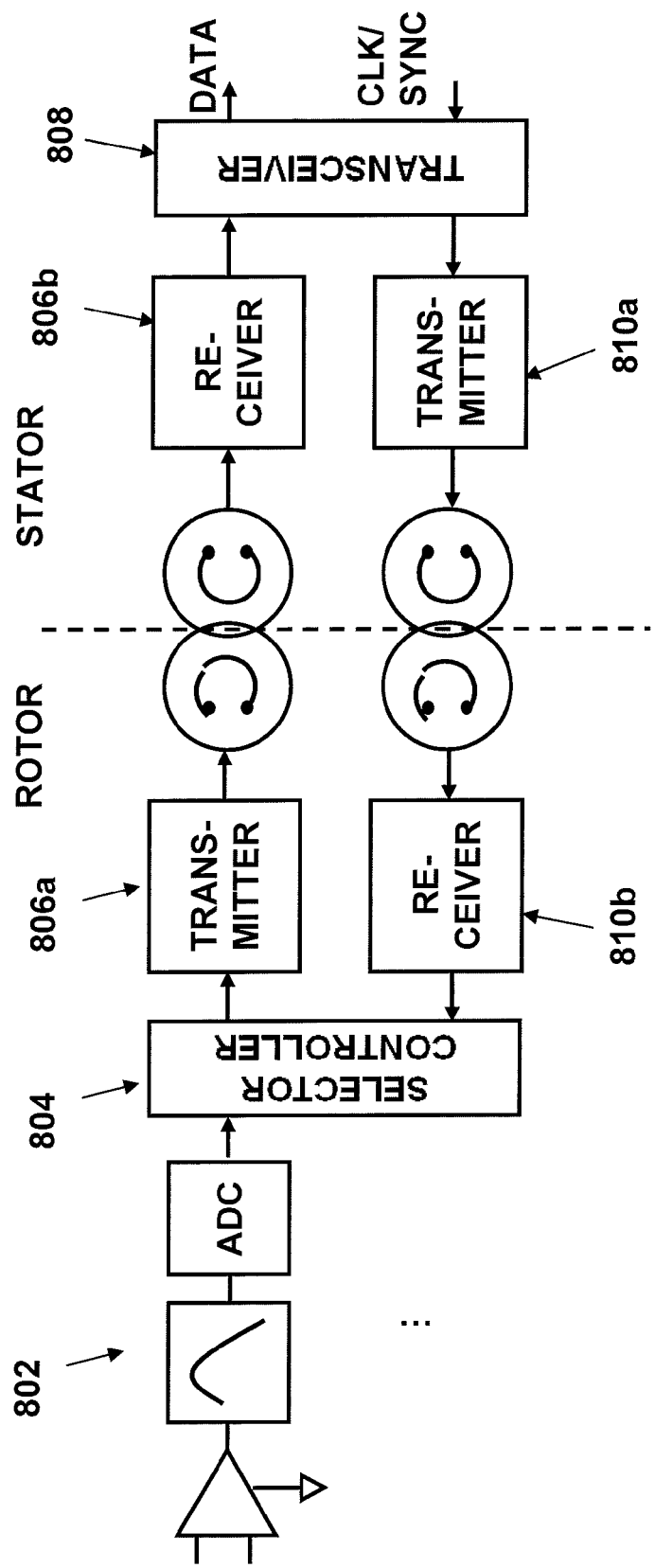
FIG. 8 depicts an illustrative block diagram of a data transfer system, according to one embodiment of the disclosure.

FIG. 8 depicts an illustrative block diagram of a data transfer system, according to one embodiment of the disclosure. Generally, the data transfer system comprises data acquisition module(s) 802 in the rotor. The data acquisition modules may be configured to gather data in the rotor using a variety of sensor types like strain gauges, pressure transducers, temperature sensors and/or vibration sensors. The data acquired may be sampled at a suitable frequency depending on the application.

A selector/controller module, may be used to select and/or control the data acquisition module(s). Preferably implemented in a Field Programmable Gate Array (FPGA), such that the selector/controller module may be easily reconfigured.

The selector/controller may be coupled to a transmitter 806*a* and receiver 806*b* pair for transmitting data signals from the rotor to the stator in a contactless manner. The data received in the stator may be provided to transceiver 808 and passed on to a different system, e.g. a front end processor. The front end processor is preferably configured to enable synchronous measurements between the different acquisition modules. In some embodiments, the synchronization accuracy may be accurate to within 1 microsecond.

According to one aspect of the disclosure, the front end processor provides a clock (or synchronization) signal. The clock signal is provided to the transceiver 808, which is configured to provide the signal to the transmitter 810*a* and receiver 810*b* pair. The transmitter and receiver pair is configured to transmit data signals from the stator to the rotor in a contactless manner. The clock signal may be provided to the selector/controller, which provides the signal to control the data acquisition module(s). Preferably, the data acquisition module(s) uses the clock signal in an analogue to digital converter, such that, e.g., the plurality of measurements in the rotor are digitized and/or sampled in sync with each other.

According to another aspect of the disclosure, the signals transmitted from the data acquisition module(s) in the rotor is encoded as a 100 Mbps Ethernet signal. Accordingly, the bit rate on the striplines and/or microstrips is about 125 Mbps. In some embodiments, the protocol used is raw Ethernet with a custom Ethertype 233.

The use of the Ethernet signal encoding advantageously provides noise immunity. Preferably, the data-rate used is a significant fraction of the 100 Mbps that fibre-optical Ethernet supports. The Ethernet encoding of the data acquired enables the stator to be equipped with a standard Ethernet interface for receiving the signals. Accordingly, the transceiver is preferably a fibre-optic transceiver that includes an Ethernet interface.

Figure 9:
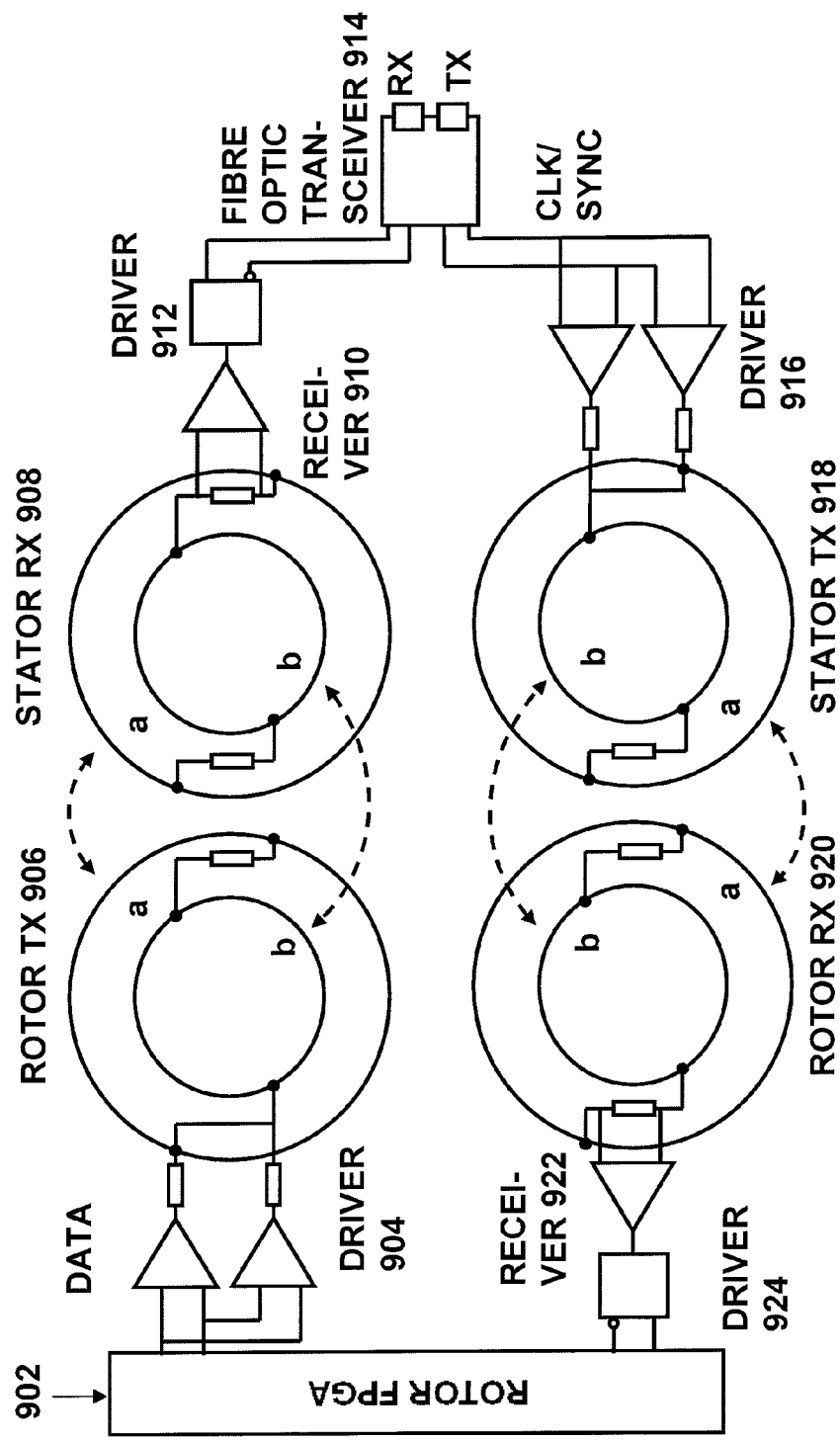
FIG. 9 depicts an illustrative schematic diagram of a data transfer system, according to one embodiment of the invention.

FIG. 9 depicts an illustrative schematic diagram of a data transfer system, according to one embodiment of the invention. The data transfer system comprises at least two parts: a first part for transmitting data from the rotor to the stator, and a second part for transmitting data from the stator to the rotor. In one embodiment, the first part is configured to transmit data acquired by data acquisition module(s) in the rotor to the stator, and the second part is configured to transmit a clock (or synchronization) signal from the stator to the rotor.

For clarity, striplines and/or microstrips are shown as concentric circles to indicate the use of differential signals and the dotted lines indicate electrical coupling. In physical form, the rotor striplines and/or microstrips (running as a full circle around the rotor flange and the stator flange) have substantially the same diameter, and the striplines and/or microstrips coupled to each other are placed in close proximity to each other, opposing each other along the broad side of the striplines and/or microstrips.

The data acquired in the rotor, e.g., by sensors, is provided to a rotor controller 902. Preferably, the rotor controller is implemented on an Field Programmable Gate Array (FPGA) for ease of programmability. The rotor controller converts the data to the format used for Ethernet protocol, and provides the data to the rotor transmitter.

According to one aspect of the disclosure, two coupled pairs of striplines and/or microstrips are used to transmit a pair of differential signals. Each stripline and/or microstrip in a pair is placed in close proximity to its counterpart along the broadside of the stripline and/or microstrip. The use of differential (complementary) signals, rather than transmitting a single signal, provides higher noise immunity. Accordingly, a differential driver 904 is arranged to provide two complementary signals to the two rotor transmitter striplines and/or microstrips 906. The two signals are received, in a contactless manner, by the stator receiver striplines and/or microstrips 908. A receiver 910 is configured to find the difference between the two signals, and may provide the resulting signal to driver 912. The fibre optic transceiver 914 then provides the signal to the front end processor for data processing.

Data is also provided from the stator to the rotor. In one embodiment, a clock (or synchronization) signal is provided from the stator part to the rotor part, using the same circuitry as the data path for transmitting data from the rotor to the stator. While in this embodiment, a clock signal is transmitted, one skilled in the art would appreciate that other types of data signals may be transmitted. The resulting system is a bi-directional contactless data transfer system. The clock signal is transmitted as two complementary signals by a differential driver 916 through two stator transmission striplines and/or microstrips 918. Two rotor receiver striplines and/or microstrips 920, coupled to the stator transmitter striplines and/or microstrips, receives the two signals in a contactless manner. The two signals are then provided to a receiver 922. The resulting signal from the receiver is provided to a driver 924. The clock signal is then used in the rotor controller 902 to synchronize a plurality of data signals, e.g., measurements from different data acquisition modules.

In some embodiments, a clock signal and a synchronization command is transmitted from the stator to the rotor. For example, the synchronization command may be modulated on the clock signal by changing the duty cycle of the clock signal from its normal value (e.g., 60%) to a command-active value (e.g., 40%).

According to one aspect of the disclosure, the pairs of striplines and/or microstrips transmitting the differential signals are terminated and/or decoupled at critical points. Advantageously the termination of the striplines and/or microstrips, applied using termination resistors, ensures signal integrity at the interface.

FIGS. 10A-B depict illustrative cross sections of a rotor position sensing assembly and a corresponding block diagram of the rotor position system, according to one embodiment of the invention. Measuring the rotational position of the rotor is particularly important in some rotating applications. To measure the rotational position, a data acquisition module is configured to sense the rotational position. Preferably, the rotational position may be used to calculate the speed of rotation of the rotor.

According to one aspect of the disclosure, an optical sensor is provided in the rotor that delivers a data pulse once per revolution (1 P signal), at a fixed rotational position. The speed of the rotation of the rotor is substantially constant within one revolution. Thus, the speed of the rotor may be calculated from the time lapse between two consecutive pulses. In an embodiment, instead of a data pulse once per revolution, a data pulse may be generated once every N revolutions (NP signal).

To provide a signal that is transmitted once per revolution, a light source and sensor pair 1012 is provided in the rotating system. An optical sensor 1012 may be excited by a light source 1014 each time when the sensor has returned to a reference position during rotation. In one embodiment, the optical sensor is provided on the rotor, and a light source for exciting the optical sensor is provided on the stator. The light source, substantially continuously lit during operation, would pass a slit 1016 once per revolution, and the slit allows the light from the light source to pass through to excite the optical sensor, once per revolution, at a reference position. As such, a 1 P pulse is generated by the optical sensor. The 1 P signal may be used to correlate other measured rotor data to the rotor position. Alternatively or additionally, the 1 P signal may be used for external data processing parts to correlate other data with the rotator position.

The optical sensor may be an infrared (IR) optical sensor, or any suitable optical sensor configured to transmit a signal when the light source passes by. The light source may be an Light Emitting Diode (LED) mounted on the stator. A (ball) lens 1018 may be used to focus the beam such that the light source is focused on a relatively small area. The focusing of the beam enables better spatial and precision and response speed than when only using the light source and optical sensor combination when measuring the speed of rotation.

As seen in FIG. 10B, the 1 P signal from the sensor in the rotor is provided to the rotor controller 1020, such that the 1 P signal may be merged with data signals acquired from data acquisition module(s) 1022. In certain embodiments, the 1 P signal from the optical sensor is provided to the rotor processor and is used to reset a (high-resolution) counter. The counter is configured to increment over time such that the value in the counter indicates the time since the last 1 P pulse. As such, the value in the counter may be provided to a front end processor to calculate the speed of rotation.

In some embodiments, the 1 P signal is merged with other data measured in the rotor. For instance, the rotational speed and the angular position relative to the reference position of each data sample may be determined from the value of the counter and the known sample rate of the data acquisition modules (sensors). This feature may be particularly useful for rotating force sensors, whose measurement data may be presented in the rotational domain.

In some embodiments, a master pair of optical sensor and light source and a slave pair of optical sensor and light source is used. For a mechanically balanced rotor, the master and slave pairs may be positioned at a shift of substantially 180 degrees. The slave pair may be used to advantageously relay the 1 P signal back to the stator with substantially minimum delay. In certain embodiments, the slave pair does not use a slit because precision in the signal from the slave pair is already assured by the signal of the master pair.

In operation, when the master optical sensor on the rotor moves across the master light source of the stator, the 1 P signal from the master pair is active. At the same time, the slave optical sensor on the stator moves across the slave light source of the rotor, and the 1 P signal from the slave pair is active. To ensure that the 1 P signal from the slave pair is exactly in phase with the signal(s) in the rotor, the rotor's data transmitter is enabled when the rotor IP master signal is active.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The invention claimed is:

1. A system for contactless power and data transfer at high rotational speeds, comprising a stator flange and a rotor flange,
said stator flange and said rotor flange being configured to rotate relative to each other about an axis of rotation,
said rotor flange comprising a first rotor ridge forming an annular support surface, said first rotor ridge comprising an inner surface having a plurality of first magnetic core parts mounted thereon, said first magnetic core parts having an L-shaped radial cross section;
said stator flange comprising a first stator ridge forming an annular support surface, said first stator ridge comprising an outer surface having a plurality of second magnetic core parts mounted thereon, said second magnetic core parts having an L-shaped radial cross section;
at least part of said outer surface of said first stator ridge radially facing at least part of said inner surface of said first rotor ridge, said first and second magnetic core parts being positioned relative to each other such that the first and second magnetic core parts form at least part of a toroidal transformer for contactless power transfer;
said rotor flange comprising a second rotor ridge comprising at least a first transmission line supported by said second rotor ridge;
said stator flange comprising a second stator ridge at least a second transmission line supported by said second stator ridge;
a broadside of the first transmission line radially facing a broadside of the second transmission such that an electric field can be formed across the air gap between said first and second transmission line for contactless data transfer.

2. The system according to claim 1, wherein:
the first and second magnetic core parts are positioned to form two air gaps that separate the two magnetic cores axially and extend radially; and/or,
wherein the magnetic field lines created by the first magnetic core and the second magnetic core run across the two air gaps axially; and/or
wherein the distance of the axial separation in the two air gaps is substantially constant as the rotor and/or the first magnetic core expands radially when the rotating system rotates at a high speed.

3. The system according to claim 1, wherein:
said first L-shaped cross section has a first leg part extending substantially in the axial direction and a first back part extending substantially in the radial direction towards the axis of rotation; and
said second L-shaped cross section having a second leg part substantially extending in the axial direction and a second back part substantially extending in the radial direction away from the axis of rotation.

4. The system according to claim 1, further comprising:
first and second wire windings associated with said at least one first and second magnetic core parts forming primary and secondary windings of a contactless power transformer; and, optionally,
power driving means connected to said primary windings.

5. The system according to claim 1, wherein a plurality of said first and second magnetic core parts are arranged circumferentially about the axis of rotation.

6. The system according to claim 1, wherein
said first rotor ridge and first stator ridge form a first enclosure for shielding said magnetic core parts form external influences; and,
said second rotor ridge and said second stator ridge form a second enclosure for shielding said transmission lines from external influences.

7. The system according to claim 1, wherein one or more of said first and second transmission lines are arranged circumferentially about the axis of rotation.

8. The system of claim 1, wherein:
said second rotor ridge further comprises a third transmission associated with said first transmission line and said second stator ridge further comprises a fourth transmission line associated with said second transmission line.

9. System according to claim 1, further comprising:
at least one data transmitter connected to said first transmission line and at least one data receiver connected to second transmission line; or,
at least one data receiver connected to said first transmission line and at least one data transmitter second transmission line.

10. The system according to claim 1, wherein at least part of said stator and/or rotor flange is made of a high-strength material; and/or, wherein said at least one of said electrical and/or magnetic rotor elements are affixed to said rotor flange using an elastomer, preferably a silicon elastomer.

11. A stator flange assembly for use in a system for contactless power and data transfer, wherein said system comprises a rotor flange, comprising a first and second rotor ridge, each forming an annular support surface, said first rotor ridge comprising an inner surface having a plurality of first magnetic core parts mounted thereon, said first magnetic core parts having an L-shaped radial cross section; said second rotor ridge comprising an inner surface having at least a first transmission line mounted thereon;

said stator flange assembly comprising:
a first stator ridge forming an annular support surface, said first stator ridge comprising a plurality of second magnetic core parts mounted thereon, said second magnetic core parts having an L-shaped radial cross section;
wherein the outer surface of said first stator ridge is configured to radially face said inner surface of said first rotor ridge such that such that contactless magnetic coupling between said first and second magnetic core parts can be achieved;
a second stator ridge forming an annular support surface, said second stator ridge comprising a second transmission line mounted thereon;
wherein a broadside of the first transmission line is configured to face a broadside of the second transmission such that an electric field can be formed across the air gap between said first and second transmission line for contactless data transfer.

12. A rotor flange assembly for use in a system for contactless power and data transfer, wherein said system comprises a stator flange, comprises a first and second stator ridge, each forming an annular support surface, said first stator ridge comprising an outer surface having a plurality of first magnetic core parts mounted thereon, said first magnetic core parts having an L-shaped radial cross section; and, said second stator ridge comprising an outer surface having at least a first transmission line mounted thereon;

said rotor flange assembly comprising:
a first rotor ridge forming an annular support surface, said first rotor ridge comprising a plurality of second magnetic core parts mounted thereon, said second magnetic core parts having an L-shaped radial cross section;
wherein said outer surface of said first stator ridge is configured to radially face said inner surface of said first rotor ridge such that contactless magnetic coupling between said first and second magnetic core parts is achieved;
a second rotor ridge forming an annular support surface, said second rotor ridge comprising at least a second transmission line mounted thereon;
wherein a broadside of said first transmission line is configured to radially face said second transmission line such that an electric field can be formed across the air gap between said first and second transmission line for contactless data transfer.

* * * * *